No. 880,107. PATENTED FEB. 25, 1908.
L. SMITH.
ELECTRIC TROLLEY.
APPLICATION FILED DEC. 9, 1905.
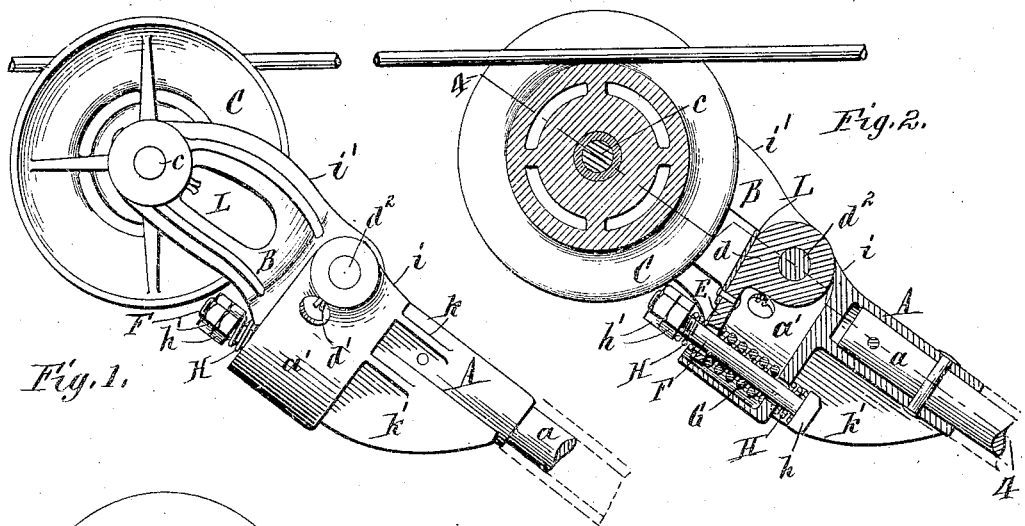
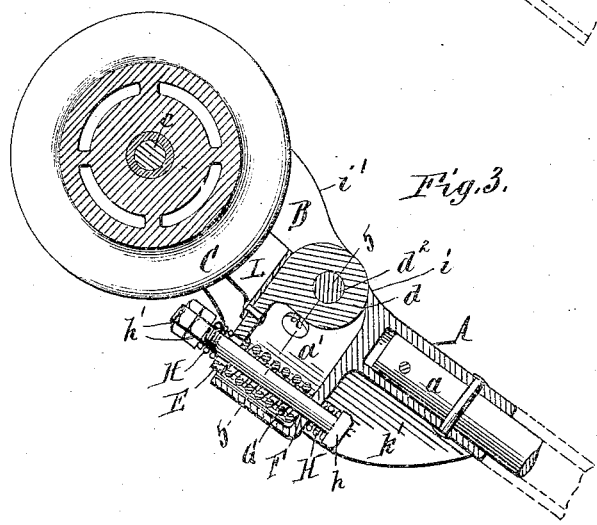
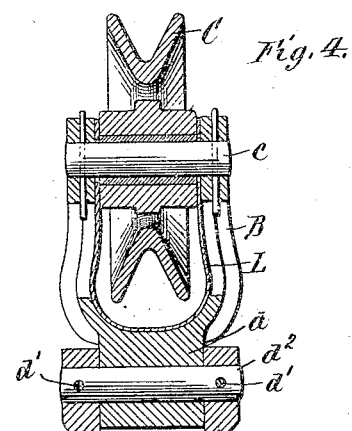
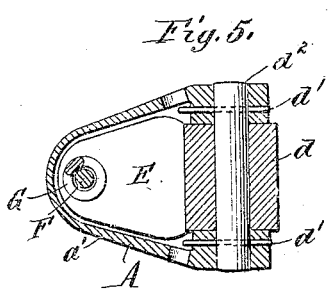
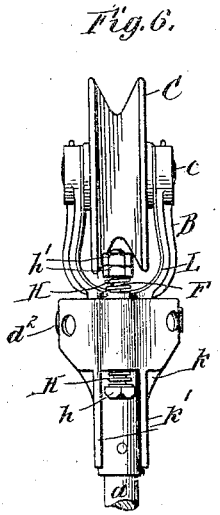
Witnesses:
R. W. Rumsey.
A. L. McGee.
Inventor,
Leonard Smith,
By Wilhelm, Parker & Hard,
Attorneys

UNITED STATES PATENT OFFICE.

LEONARD SMITH, OF NORTH TONAWANDA, NEW YORK.

ELECTRIC TROLLEY.

No. 880,107.

Specification of Letters Patent.

Patented Feb. 25, 1908.

Application filed December 9, 1905. Serial No. 291,071.

*To all whom it may concern:*

Be it known that I, LEONARD SMITH, a citizen of the United States, residing at North Tonawanda, in the county of Niagara and State of New York, have invented a new and useful Improvement in Electric Trolleys, of which the following is a specification.

This invention relates more particularly to trolleys for electric railways and has for its object to produce a trolley in which the wheel is yieldingly mounted on the trolley arm in such manner as to greatly increase the life of the trolley, and trolley wire hangers, decrease the objectionable noise in the car caused by the traveling contact of the wheel with the trolley wire, and the striking of the wheel against the hangers, and prevent the trolley from leaving the trolley wire, and improve the contact between the wheel and trolley wire.

In the ordinary overhead electric trolley railway systems the trolley wheel is journaled at the upper end of a long arm which is pivoted to a base on the car and is pressed upwardly to hold the wheel in contact with the trolley wire by a spring or other pressure device. On long distance lines on which the cars run at high speeds great annoyance is experienced from the trolleys leaving or "jumping" the trolley wires and striking the wire hangers or supports with resulting injury to the trolley or wire support, or both. The trolley is thrown from the wire by impact with the trolley wire hangers or ears and this is especially liable to occur when the ear is poorly constructed or attached to the wire so that it is struck by the wheel, and when the trolley wire is slack so that the trolley presses the wire up considerably between the ears and must lower to pass the ear. The pounding of the trolley against the ears wears the wheel and its bushing, so that the wheel does not run true and therefore produces a very disagreeable whirring or grinding noise in the car in addition to the noise caused by the trolley striking the ears. The wear and uneven running of the wheel produces an electric arc between the wheel and the ears which burns and in time destroys these parts, and also between the bushing and axle so that the axles are frequently broken. These various defects and disadvantages are in large part due to the fact that the trolley is journaled in rigid bearings on the trolley arm and cannot yield independently of the long heavy trolley arm in such manner as to cushion the shock in striking or passing the ears. By yieldingly mounting the trolley on the arm, as hereinafter described, these defects and difficulties are overcome while, at the same time, the trolley is not open to the many objections to trolleys heretofore made—with a similar end in view.

In the accompanying drawings: Figure 1 is a side elevation of an electric trolley embodying the invention, showing the position of the harp when the trolley wheel is against the trolley wire. Fig. 2 is a sectional elevation thereof. Fig. 3 is a sectional elevation thereof similar to Fig. 2, but showing the trolley off of the trolley wire. Fig. 4 is a transverse sectional elevation thereof in line 4—4, Fig. 2. Fig. 5 is a cross section of the head in line 5—5, Fig. 3, looking toward the wheel. Fig. 6 is a rear elevation, on a reduced scale, of the trolley.

Like letters of reference refer to like parts in the several figures.

A represents a head which is rigidly attached to the upper end of the trolley arm (not shown) by a rod $a$ riveted in a reduced neck or socket portion of the head and in the hollow arm, or in any other suitable manner. The upper portion of the head is made hollow or provided with a spring chamber $a'$.

B represents a forked harp or frame between the sides or forks of which is journaled the ordinary trolley wheel C in any usual or suitable manner, for instance, by an axle $c$ passing through the hub of the wheel and pinned in holes in the sides of the harp. The harp is pivoted at its lower front portion to the head A, for which purpose the harp is provided with a perforated hinge ear or lug $d$ which extends into the chamber $a'$ in the head, and through which ear passes a pivot $d^2$ which is secured at its ends in holes in the side walls of the head, by cotter pins $d'$ or other means. The harp is provided with a base plate or part E which extends rearwardly from the pivot ear in the spring chamber $a'$ of the head and is preferably of a size and shape to substantially close the open upper end of the spring chamber, as shown in Fig. 5. This base plate E and the base of the spring chamber of the head are perforated and a bolt or rod F extends loosely through said perforations. A spring G confined in the spring chamber $a'$ of the head presses the harp toward the trolley wire. Preferably a coil spring is employed which surrounds the bolt F in the spring chamber, bearing at its opposite ends against the bases of the spring chamber and harp and exerting its pressure to swing the harp forwardly or upwardly—on its pivot against the trolley wire. Springs H also surround the projecting ends of the bolt F between the bases of the harp and spring chamber and enlargements on the bolt consisting, in the construction shown, of a head $h$ at one end of the bolt and adjusting and lock nuts $h'$ screwed on the other end of the bolt. These springs are preferably lighter than the other spring G and serve to yieldingly limit the upward movement of the harp and cushion the harp to prevent the noise which would result if rigid stops were provided to limit the upward movement of the harp by the spring G. The strength of the springs G and H is such that when the trolley wheel is pressed against the trolley wire by the usual spring or pressure device in the trolley stand, to which the arm is pivoted, the harp will be deflected downwardly somewhat and the spring G strained, as indicated in Figs. 1 and 2. There is therefore always a tendency of the trolley harp and wheel to lift somewhat independently of the trolley arm to hold the trolley wire. The harp and wheel are not rigid with the arm but can yield or spring both upwardly and downwardly from the normal intermediate position in which they are held when the wheel is in contact with the trolley wire and the movement in both directions is cushioned or spring-opposed.

In the use of the trolley, when the wheel strikes a hanger ear it will yield independently of the trolley arm and the force of the blow with the consequent wear on the trolley and ear will be greatly lessened. The life of the trolley wheel, bushing and axle, as well as the hanger ears, is therefore greatly lengthened and the disagreeable noise in the car, due to the wheel striking the ears and the uneven running of the wheel when it or its bushing are worn, is also materially reduced. Furthermore, the harp and wheel will recover their normal position after depression much quicker than if rigid with the arm, the upper end of which is necessarily sluggish in its movements on account of the length and weight of the arm. The wheel is therefore much less liable to leave or "jump" the trolley wire.

It has been suggested heretofore to mount the trolley wheel yieldingly on the arm but the construction of these trolleys has been such as to render them impractical for various reasons and preclude their use on the railways. It has been proposed, for instance, to employ a pivoted spring-pressed harp which, in normal position, when the wheel is on the wire, rests against fixed stops on the arm so as to hold the harp rigid with the arm against depression. Such construction does not lessen the force of the blow against the hanger ear and does not in any degree lessen the wear on the parts and the noise due to the impact, and inasmuch as the arm itself must lower under the force of the blow the device would have very little, if any, effect in preventing the wheel from leaving the wire. In other trolleys in which the wheel can yield downwardly independently of the arm, the constructions are either expensive and cumbersome and of such shape that in the event of the trolley leaving the wire they would catch and tear down the wire hangers or supports or they are too frail and flimsy.

In the trolley herein described the front faces $i$ and $i'$ of the head and harp are substantially flush with each other and extend upwardly and rearwardly in substantially the direction of the trolley arm and form no projections which could catch on the hanger ears or supports for the trolley wire and destroy or injure the same or the trolley in case the trolley should leave the wire. The upper hollow portion of the head is of substantially the same width as the harp and incloses the base portion of the harp and the spring G so as to guard these parts, and the upper hollow portion of the head is joined to the contracted neck portion thereof by side ribs $k$ and rear ribs $k'$ which strengthen the head and have inclined or curved outer edges which prevent the enlarged portions of the head and harp from striking or catching on the trolley wire, its hangers or supports. The rear ribs $k'$ also serve to inclose and protect the spring bolt F from striking any object. The construction of the head and harp is, therefore, such that if the trolley leaves the wire it can do no harm and at the same time it can be much more readily replaced on the wire.

L represents the usual U-shaped contact spring secured inside of the harp and bearing against the ends of the trolley wheel hub.

I claim as my invention:

1. The combination of a trolley wheel, a frame in which said wheel is journaled, a head to which said frame is pivoted at its lower front portion, said frame having a head projecting rearwardly from said pivot, and said head having a part projecting rearwardly beneath said projecting part of the frame, and a spring between said projecting parts of the frame and head, said projecting part of the head forming a guard to prevent said projecting part of the frame and said spring from striking the trolley wire or other object, substantially as set forth.

2. The combination of a trolley wheel, a frame in which said wheel is journaled, a head having a hollow portion which underlies said frame and in which the lower portion of said frame is pivoted, and a spring in said hollow portion of the head which presses the frame toward the trolley wire and normally holds it out of contact with the underlying part of the head to allow the frame to swing downwardly independently of the head, the hollow portion of said head inclosing and forming a guard for the lower portion of said frame and said spring, substantially as set forth.

3. The combination of a trolley wheel, a rigid frame in which said wheel is journaled, a head having a part which underlies said frame and to which said frame is pivoted to swing toward and from the trolley wire only, and springs which yieldingly oppose the movement of said frame in opposite directions and normally press said frame toward the trolley wire and hold it out of contact with the underlying part of the head to allow the frame to swing downwardly independently of said head, said underlying part of the head forming a guard for said springs, substantially as set forth.

4. The combination of a trolley wheel, a frame in which said wheel is journaled, a head to the front portion of which the front portion of said frame is pivoted, said head and frame having portions extending rearwardly from their pivotal connection, a spring between said portions of the head and frame within the confines of said head for pressing the frame toward the trolley wire, and means for yieldingly opposing the movement of the frame toward the trolley wire, substantially as set forth.

5. The combination of a trolley wheel, a frame in which said wheel is journaled, a head to which said frame is pivoted, a rod arranged in rear of the pivotal connection of said frame and head and passing through holes in said frame and head, a spring surrounding said rod between said frame and head, and springs between enlargements at the ends of said rod and said frame and head, substantially as set forth.

6. The combination of a trolley wheel, a frame in which said wheel is journaled, a head having a spring chamber in which said frame is pivoted, said frame having a portion extending rearwardly in said spring chamber from the pivotal connection of the frame and head, and a spring contained in said chamber and acting against said rearwardly extending part of the frame to press the frame toward the trolley wire, substantially as set forth.

7. The combination of a trolley wheel, a frame in which said wheel is journaled, a head having a hollow portion in which the lower end of said frame is pivoted and inclosed, and a compression spring located in said hollow portion of the head between the same and said frame and distant from the pivot for said frame for pressing said wheel against the trolley wire and holding the frame out of contact with said head, substantially as set forth.

Witness my hand, this first day of December, 1905.

LEONARD SMITH.

Witnesses:
J. M. PATTEN,
R. S. PATTEN.